Aug. 7, 1928.
L. MAMBOURG
1,680,227
SHEET GLASS PROTECTING MEANS AND METHOD
Filed Nov. 12, 1925
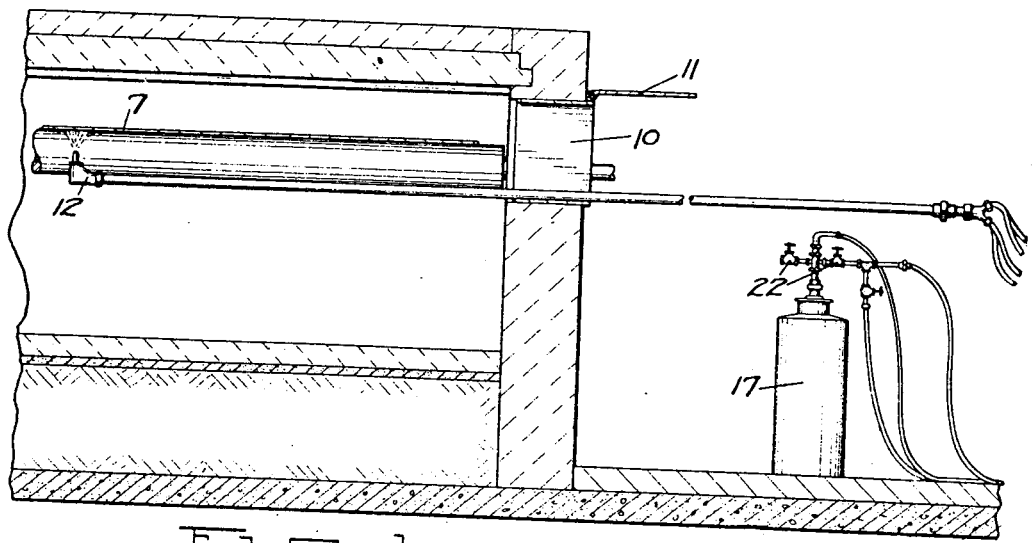
Fig. 1.
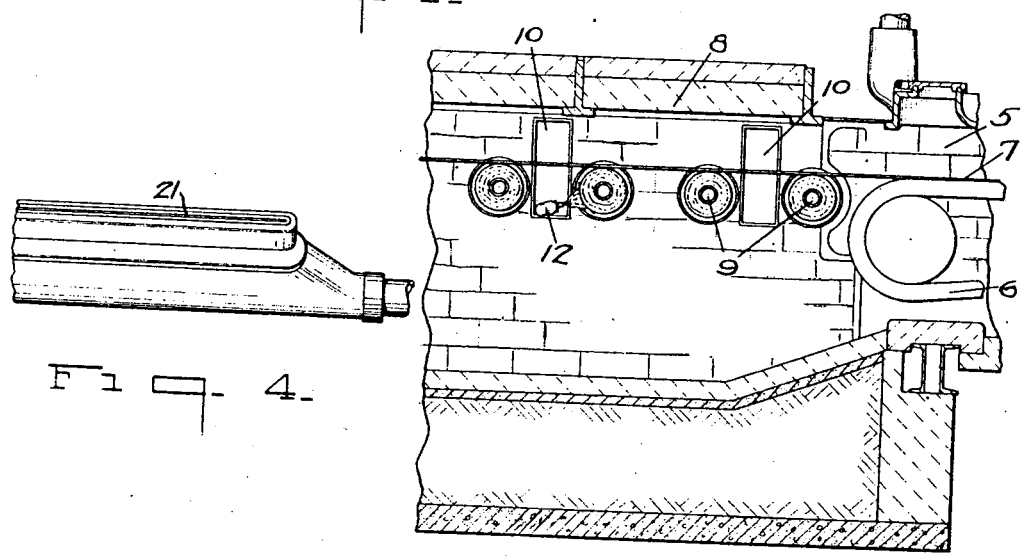
Fig. 4.
Fig. 2.
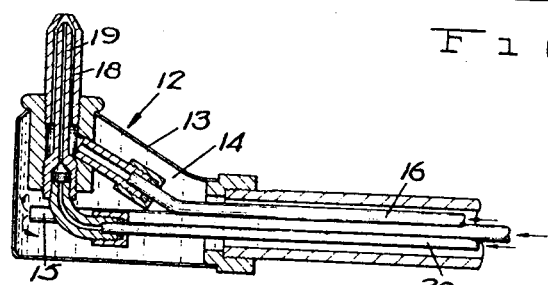
Fig. 3.
INVENTOR.
Leopold Mambourg.
Frank Fraser
ATTORNEY.

Patented Aug. 7, 1928.

1,680,227

UNITED STATES PATENT OFFICE.

LEOPOLD MAMBOURG, OF LANCASTER, OHIO, ASSIGNOR TO THE LIBBEY-OWENS SHEET GLASS COMPANY, OF TOLEDO, OHIO, A CORPORATION OF OHIO.

SHEET-GLASS-PROTECTING MEANS AND METHOD.

Application filed November 12, 1925. Serial No. 68,509.

The present invention relates to sheet glass apparatus, and has particular reference to means adapted to prevent the surface of the sheet from becoming injured or marred.

An important object of the invention is to provide means which will create a protective medium between the sheet of glass being produced and those parts of the apparatus with which the sheet contacts.

Another object of the invention is to provide means of this nature wherein a sheet being drawn from a mass of molten glass may be deflected over suitable means to a horizontal plane where it may be passed over flattening means and through an annealing leer, the sheet being protected against surface marks by means of a suitable mixture which may be applied to the apparatus itself or to the sheet.

A further object of the invention is to provide means whereby a continuous spray of protective film may be applied either directly to the sheet being formed or the apparatus with which the sheet contacts, the film being of a nature to prevent injury to the sheet while at the same time the fire polished finish of the sheet will not be disturbed.

Other objects and advantages of the invention will become apparent during the course of the following description.

In the drawings wherein like numerals are employed to designate like parts throughout the same, Fig. 1 is a fragmentary transverse section through a portion of sheet glass apparatus, showing one form of the invention in use, Fig. 2 is a fragmentary longitudinal section thereof, Fig. 3 is a sectional view through one form of applying means, and Fig. 4 is a view of a slightly modified construction.

Although this invention can be used with any form of sheet glass apparatus, it is illustrated as being used in connection with the Colburn type of machine such as shown in the Colburn Patent No. 1,248,809, granted December 4, 1917. In this patent a sheet is continuously drawn from a mass of molten glass contained in a draw pot which is replenished from a tank furnace. The sheet is drawn in a vertical plane a slight distance, after which it is deflected over a suitable bending member, passed over flattening and drawing table, and then through an annealing leer. The sheet is somewhat plastic and subject to surface marking as it passes over the deflecting or bending roll over the draw table and in the forepart of the leer. The bending roll is usually formed from a heat-resisting non-corrosive metal as is the draw table. The leer rolls are usually provided with an outer surface of asbestos. It has been common practice to swab the various leer rolls and other parts of the machine with a graphite para mica solution which in its usual form comprises graphite, para mica and cylinder oil, the three when combined producing a colloidal solution. This mixture, when applied to the various parts of the machine, prevents injury to the sheet when in contact with the said parts. However, as in the Colburn machine, there are approximately 200 leer rolls, and it is quite a problem to keep them properly covered with this solution. The sheet is hottest at the front part of the leer and it is these front leer rolls which should be given the most attention.

It is an aim of the present invention to provide means whereby the various leer rolls, draw table, bending roll, etc. can automatically and continuously be sprayed with a protective solution. Although it is preferable to spray the solution directly upon the various rolls, etc., the sheet itself may be sprayed. In either case the object in mind is to provide a protective medium between the sheet and the various parts with which the sheet contacts, especially when the sheet is in a relatively hot state and noticeably subject to surface impressions.

In the drawings, the numeral 5 designates the drawing chamber of a sheet producing apparatus, and as shown in Fig. 2, contains a draw table or the like 6. The sheet 7, after passing from the draw table 6, is introduced within the annealing leer 8, which includes a plurality of rotatable leer rolls 9 which support the sheet. Arranged along the sides of the leer are openings 10 which may have associated therewith a closure member 11.

The graphite para mica solution may be applied to the rolls and the sheet by means of a spray device which is designated in its entirety by the numeral 12. This spray device comprises a chamber 13 adapted to contain a cooling medium 14 supplied through a conduit 15. The mixture is drawn through a conduit 16 terminating at one end in suitable supply container 17, and at the other end in the discharge nozzle 18. Running centrally through the discharge nozzle 18 is a pipe 19 having connection with a pipe 20 through which compressed air may be forced, drawing the para mica solution through the conduit 16 and out upon the rolls or sheet, as has been set forth. The cooling medium 14 is provided to prevent overheating of the device when it is introduced in the hot end of the leer or around other portions of the apparatus. Of course it is to be understood that the spray device is not necessarily limited to the type shown in Fig. 3. In Fig. 4 the construction is modified to the extent that the mixture issues through an elongated slot 21, preferably of a length substantially the same as the width of the sheet so that the nozzle will not have to be moved during the spraying operation. As is shown diagrammatically in Fig. 1, the nozzle 12 is supported by the conduits which supply the mixture and air. Various valves and the like 22 may be provided to control the pressure and amount of mixture applied to the various parts.

In actual use the mixture may either be sprayed directly upon the sheet or upon the apparatus itself. The deposit may either be entirely continuous by means of a very slow spraying, or if it is desired an intermittent spraying may be had ever so often, depending upon the rapidity with which the sheet is produced, the temperatures, etc. The dope or mixture will not affect the luster of the finished sheet but will prevent surface demarcation due to irregularities, etc. which may be present on the asbestos leer rolls, draw table or bending roll. In the type of spray device shown in Fig. 4, a nozzle is preferably provided for every member to be sprayed, although it can be moved from place to place as desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet from a mass of molten glass, and means for spraying a protective film upon the sheet or parts of the glass apparatus with which the sheet contacts.

2. In sheet glass apparatus, means for drawing a sheet from a mass of molten glass, and means for continuously spraying a protective film between the sheet and portions of the sheet apparatus with which it contacts.

3. In sheet glass apparatus, means for drawing a sheet from a mass of molten glass, and means for spraying a graphite film between the sheet and parts of the apparatus with which the sheet contacts.

4. In sheet glass apparatus, means for drawing a sheet from a mass of molten glass, and means for spraying a graphite para mica solution upon those surfaces of the glass apparatus with which the sheet contacts.

5. In sheet glass apparatus, means for drawing a sheet from a mass of molten glass, and means for spraying a protective colloidal solution upon those surfaces of the apparatus with which the sheet contacts.

6. In sheet glass apparatus, means for drawing a sheet from a mass of molten glass, a spray device adapted for applying a protective film upon that surface of the apparatus with which the hot sheet contacts, and means for preventing overheating of the spray device.

7. In sheet glass apparatus, means for drawing a sheet from a mass of molten glass, and a spray device associated with the surfaces of the apparatus with which the hot sheet contacts and adapted for spraying a graphite solution thereon.

8. In sheet glass apparatus, means for drawing a sheet from a mass of molten glass, a spray device associated with the surfaces of the apparatus with which the hot sheet contacts and adapted for spraying a graphite solution thereon; and means for preventing overheating of the spray device.

9. The process of protecting a glass sheet consisting in spraying a protective film between the sheet and portions of the sheet forming apparatus with which it contacts.

10. The process of protecting a glass sheet, consisting in interposing a graphite solution between the sheet and portions of the sheet forming apparatus with which it contacts.

11. The process of protecting a glass sheet, consisting in interposing a colloidal solution between the sheets and portions of the sheet forming apparatus with which the sheet contacts.

12. The process of protecting a glass sheet, consisting in spraying a graphite solution between the sheet and portions of the sheet forming apparatus with which it contacts.

13. The process of protecting a glass sheet, consisting in spraying a colloidal solution between the sheet and portions of the sheet forming apparatus with which the sheet contacts.

14. The process of protecting a hot glass sheet, consisting in applying a graphite solution upon those surfaces of the sheet forming apparatus with which the hot sheet contacts.

15. The process of protecting a hot glass sheet, consisting in spraying a colloidal solu-